March 24, 1970 J. O. PAIVINEN 3,502,898

MAGNETIC SWITCHING CIRCUIT

Filed Feb. 4, 1959

INVENTOR
JOHN O. PAIVINEN
BY Laurence R. Brown
ATTORNEY

United States Patent Office 3,502,898
Patented Mar. 24, 1970

3,502,898
MAGNETIC SWITCHING CIRCUIT

John O. Paivinen, Palo Alto, Calif., assignor to Burroughs Corporation, Detroit, Mich., a corporation of Michigan Continuation-in-part of application Ser. No. 454,949, Sept. 9, 1954. This application Feb. 4, 1959, Ser. No. 791,232
Int. Cl. H03k *19/22, 17/80*
U.S. Cl. 307—88 30 Claims

ABSTRACT OF THE DISCLOSURE

Two or more bistable magnetic cores each containing a sensing winding, such sensing windings being connected in series with each other and with a load impedance (preferably an input winding on another core). A constant voltage pulse is applied across the series circuit, and the current flow from this source is dependent upon the impedance presented by the sensing windings, which, in turn, is dependent upon the remanent states of the respective cores. The circuit may operate as a logical AND circuit if the threshold of the load impedance is such as to respond only to the current level produced when the input cores are all in a binary ONE remanent state.

This application is a continuation-in-part of a copending application, Ser. No. 454,949, filed Sept. 9, 1954, now abandoned entitled "Magnetic Switching Circuit."

This invention relates generally to magnetic devices and more particularly to magnetic switching or gate circuits and magnetic memory circuits.

In the computing art gate circuits and memory circuits are utilized extensively. There are available electronic, electromagnetic and magnetic type gating circuits and memory circuits. The electronic type circuits can be made to have a very high speed of operation but the tubes therein require a constant uninterrupted power supply and are likely to change their characteristics as the result of wear and age. The relay type of electromechanical circuits is relatively slow in operation, is subject to mechanical failures and also requires the maintenance of a constant power supply. Magnetic gate circuits and memory circuits, on the other hand, offer the advantages of stable operating characteristics with age and permanency of storage of information without maintenance of constant applied power.

An important object of the present invention is to provide an improved magnetic device adaptable as a gate circuit or a memory device.

Another important object of the invention is to provide a gate circuit and memory circuit having operating characteristics that remain substantially unchanged with age and use.

A third important object of the invention is the improvement of gate circuits and memory circuits generally.

In accordance with one embodiment of the invention, there is provided a plurality of first magnetic cores, and a load impedance or second magnetic core. Each of said first cores has an individual input winding means, an individual sensing winding means, and an individual clearing winding means. The second magnetic core has an input winding, a clearing winding, and an output winding. Said sensing windings and the input winding of said second core are connected in series arranged. A first energizing means is adapted to individually and selectively energize said input windings of the first cores to cause selective ones of these cores to assume a condition of remanence of a first polarity. A second energizing means is connected in series with said sensing windings and the input windings of said second core and is adapted to drive the first cores toward magnetic flux saturation in said first polarity. A third energizing means is provided to energize said clearing winding means of the first cores in such a manner that the said magnetic cores are caused to become saturated in the second polarity. The impedance presented to the said second energizing means by any one or more of said sensing windings, when the core or cores associated therewith are caused to be switched from a remanence condition of the second polarity toward a remanence condition of said first polarity, is sufficiently large during switching so that only a relatively small signal is created across said load impedance means. However, when the remanence condition of all of the said magnetic cores is of said first polarity, then the impedance presented to the said second energizing source by said sensing windings will be small and result in a relatively large signal being created across the said load impedance. Production of the relatively large signal is sufficient to cause the said second magnetic core to switch from a remanence condition of second polarity to a remanence condition of said first polarity. When a relatively small signal is produced, it will not switch the said second magnetic core from a remanence condition of one polarity to a remanence condition of the other polarity. The result is a two-value output from the magnetic device.

In accordance with one feature of the invention, individual diodes are connected across each of the said sensing windings in such a manner that the large back impedance of each of said diodes is presented to the said second energizing means.

These and other objects and features of the invention will become more fully understood from the following detailed description thereof when read in conjunction with the drawings in which.

Figure 1:
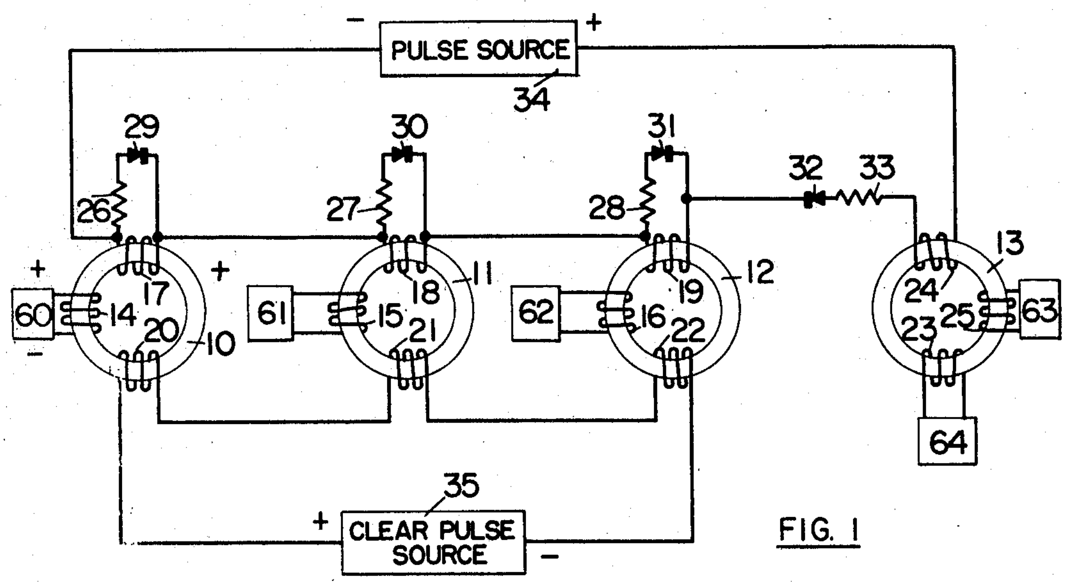
FIGURE 1 is a schematic sketch of a preferred embodiment of the invention.

Referring now to FIG. 1, the magnetic cores 10, 11 and 12 each have wound thereon input windings 14, 15 and 16, respectively, sensing windings 17, 18 and 19, respectively, and clearing windings 20, 21 and 22, respectively. The sensing windings 17, 18 and 19 are connected together in series arrangement with a constant voltage pulse source 34. The clearing windings 20, 21 and 22 are connected in series arrangement with the pulse source 35. Input sources 60, 61 and 62 are connected respectively to the input windings 14, 15 and 16. Each of the sensing windings 17, 18 and 19 has associated therewith a resistor and an asymmetrically conducting device in series circuit. More specifically, winding 17 has connected thereacross the series combination of resistor 26 and asymmetrically conducting device 29; winding 18 has connected thereacross the series combination of resistor 27 and asymmetrically conducting device 30; and winding 19 has connected thereacross resistor 28 and asymmetrically conducting device 31. Each of these resistor-asymmetrically conducting device series circuits performs the function for its associated sensing winding of providing a low impedance path for currents of a certain polarity induced in said sensing windings. Resistor 33 and asymmetrically conducting device 32 connect the series combination of the sensing windings 17, 18 and 19 to the input winding 24 wound on magnetic core 13. Clearing means 64 is adapted to energize a clearing and advance winding 23 which is also wound on core 13. Output winding 25 is wound on the core 13 and is connected to load or utilization circuit 63.

In FIG. 1 the following materials and values may be used. Magnetic cores 10, 11, 12 and 13 are composed of a material having a substantially rectangularly shaped hysteresis loop such as orthonik. Other materials having similar characteristics may be used. The cross sectional area of each of the cores is about 0.00025 square inches and the mean circumference is approximately ⅜ inch.

Input windings 14, 15 and 16 each have 40 turns. Sensing windings 17, 18 and 19 each have 190 turns. Clearing windings 20, 21 and 22 each have 150 turns. Resistances 26, 27 and 28 each have a value of 10 ohms. Asymmetrically conducting devices 29, 30, 31 and 32 are of the selenium type, although it is to be noted that other type area of each of the cores is about 0.00025 square inch asymmetrically by conducting devices can be used. Impedance 33 has a value of 43 ohms. Input winding 24, output winding 25, and clearing winding 23 wound on magnetic core 13 have 35, 80, and 150 turns, respectively.

Figure 2:
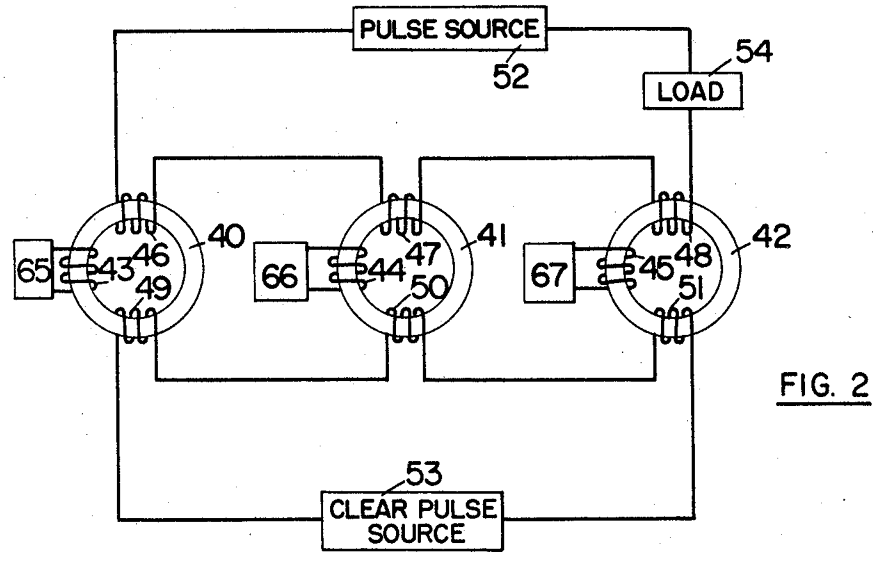
FIG. 2 is a schematic sketch of another preferred embodiment of the invention.

Referring now to FIG. 2, there is shown another embodiment of the invention. Sensing windings 46, 47 and 48 are wound on magnetic cores 40, 41 and 42, respectively, and are connected in a series arrangement with a constant voltage pulse source 52 and the load of utilization means 54. Clearing windings 49, 50 and 51 are wound on cores 40, 41 and 42, respectively, and, further, are connected in series arrangement with the clear pulse source 53. Each of the input windings 43, 44 and 45 have connected thereacross a source input means 65, 66 and 67, respectively.

The pulses from pulse source 34 of FIG. 1 and the pulse source 52 of FIG. 2 can have a peak value of 1.5 volts and a time duration of about 20 microseconds.

Referring again to FIG. 1, the operation of the circuit shown therein will now be described. Assume as a first set of conditions that input pulses have been passed through windings 14, 15 and 16 to cause magnetic cores 10, 11 and 12 to assume a condition of positive remanence. Assume further that magnetic core 13 has been placed in a condition of negative remanence by causing a current of the proper polarity and magnitude to flow through clearing winding 23. If now a sensing current is caused to flow through sensing windings 17, 18 and 19 of cores 10, 11 and 12, asymmetrically conducting device 32, resistance 33, and winding 24 of core 13 from sensing voltage source 34, there will be practically no impedance offered to said sensing current by the sensing windings 17, 18 and 19 since the sensing current will cause the magnetic flux of the cores to change from a condition of positive remanence to a condition of positive saturation. Consequently, the voltage impressed across winding 24 and the current flow therethrough will be sufficiently large to cause magnetic core 13 to switch from a condition of negative polarity to a condition of positive saturation which will induce a voltage across output winding 25. Thus, if the circuit is regarded as a gate it is in an open condition when an input pulse has been entered into all three of the magnetic cores 10, 11 and 12. Following this, the cores can then be cleared to a negative remanence by application of a clearing pulse from source 35 through windings 20, 21 and 22.

If any one or all of the magnetic cores 10, 11 or 12 is in a condition of negative remanence, however, the associated sensing winding will present a high impedance to the said sensing current since the sensing current will cause the magnetic core 10, 11 or 12 to switch from a condition of negative remanence to positive saturation. The voltage drop across the winding of the switching core 10, 11, or 12 will leave insufficient voltage to switch the magnetic core 13 from a condition of negative remanence to a condition of positive saturation. Since the winding 24 has substantially fewer turns than any one of the windings 17, 18 and 19, even though the same current flows through each of the four windings, the magnetizing force exerted on cores 10, 11 and 12 is substantially greater than that exerted on core 13 and therefore cores 10, 11 and 12 will begin switching before core 13 so as to increase the impedance in the sensing circuit and thereby decrease the current flow through winding 24 and the voltage applied thereacross. Consequently, there will be no output voltage induced in output winding 25. Thus, if the circuit is utilized as a gate circuit, it can be said to be closed.

As a memory unit, if operated under the conditions discussed, the sensing current will detect whether one or more of the magnetic cores is in a condition of negative remanence. Alternatively, if desired, the energy content of the output pulse from pulse source 34 of FIG. 1 can be increased so that core 13 will be switched if only one of the cores 10, 11 or 12 is in a condition of negative remanence, but will not be switched if two of the cores 10, 11 or 12 is in a condition of negative remanence. In either case, however, a current is caused to flow through windings 20, 21 and 22 from the clearing source 35 to return all the cores 10, 11 and 12 to a condition of negative remanence, and core 13 is caused to be returned to a condition of negative remanence by passing a current through winding 23 from clearing source 64, before input pulses are applied to windings 14, 15 and 16.

Diodes 29, 30, 31 and 32 are introduced to prevent unwanted information flow that would represent a deviation from the operation described above. For example, in the absence of these diodes the application of an input pulse to winding 14 of core 10 would result in an induced voltage across sensing winding 17 which would, in turn, cause a small current flow in the sensing windings 18 and 19 of cores 11 and 12 that would have the same effect as a clearing pulse from source 35 at those cores. The same current would flow in the input winding 24 of core 13 with an effect similar to a clear or read-out pulse applied to winding 23 of this core. The diode 32 causes any such current to be negligibly small. Similarly, in the absence of the diodes when core 10 is cleared by a pulse through winding 20, a small current would flow in the opposite direction through the sensing windings 18 and 19 of cores 11 and 12 with an effect on these cores similar to an input pulse through the input windings 15 and 16 of cores and 11 and 12. This same current flow in the input winding 24 of core 13 with an effect similar to a true input or sensing pulse through winding 24 of this core. Diode 29 presents a shunting path for this current and proper choice of resistances 26 and 33 will make any such undesirable currents negligibly small. Since the structure is symmetrical, diodes 30 and 31 are needed at cores 11 and 12 for the same reasons.

Referring to FIG. 2, the operation of the circuit shown therein is substantially the same as the circuit of FIG. 1 except that the load 54 in the form of an impedance replaces core 13 and its windings, shown in FIG. 1. The different levels of current flowing through the impedance 54 due to the switching or non-switching of the magnetic cores 40, 41 and 42 will cause different potential drops across the said impedance 54 which can be detected in a variety of well known means. It is to be noted also that circuit elements corresponding to asymmetrically conducting devices 29, 30, 31 and 32 and resistances 26, 27, 28 and 33 of FIG. 1 are not present in FIG. 2. The circuit of FIG. 2 will operate without such elements although not as efficiently as the circuit of FIG. 1.

Thus it is seen that the transfer of information to the output core 13 or load 54 is dependent upon whether or not one or more of the input cores have experienced an input pulse between successive sense or inspect pulses. The circuit therefore functions as a gate circuit where an output or information transfer is obtained for an occurrence of any input pulse in the period of time between successive sense pulses. No output pulse is obtained for a non-coincidence or absence of one or more input pulses over the same period of time. The circuit also performs the function of a memory cell since the input pulses need not occur at any particular time between successive sense pulses. Once any of the input cores has been set in one condition of polarity by a pulse on its input winding, the core will remain in that condition until the application of the next sense pulse. Three input cores are employed in the two embodiments of the invention described and illustrated herein, but it is understood that various numbers of such input cores may be used in the device and that the three cores herein illustrated merely exemplify one embodiment of the invention.

While the magnitude of the sensing voltage pulse in each of the above embodiments of the present invention has been described as being of sufficient amplitude and duration to switch the input cores 10, 11 and 12 or 40, 41 and 42 from negative remanence to positive saturation (i.e., complete switching), and, alternatively, as being of sufficient amplitude and duration merely to switch such input cores from negative remanence to a positive remanence condition, which may be short of saturation (i.e., incomplete switching), it will be found that in practice, operation of the latter type is preferred. The reason for this is that since, as discussed above, the high impedance state of the sensing winding on the respective input cores exists only during the time the core is actually switching, one must avoid driving the core beyond its switching condition for if this is done, the sensing winding will pass through its high impedance state and into its low impedance state and, while in its low impedance state, high sensing current will flow. This high current flow after switching will produce a spurious voltage pulse either across winding 24 of FIG. 1 tending to switch output core 13, or across the output load 54 of FIG. 2. While it is true that one can avoid this spurious output pulse by using a sensing pulse of amplitude and duration just sufficient to switch the core, as described, in a practical case, where the amplitude and/or duration of this pulse may vary slightly, or the cores do not exhibit perfectly rectangular hysteresis loops, such amplitude and/or duration is preferably chosen to be less than sufficient to switch the core so as to maintain some safety margin. This preferred operation can be achieved by use of the circuit parameters set forth in detail hereinabove in connection with FIG. 1.

It is to be noted that the embodiments of the invention described herein are but preferred embodiments of the same and that various changes may be made in circuit arrangement, circuit constants, and number of magnetic cores without departing from the scope or spirit of the invention.

I claim:

1. In combination: an input magnetic core and an output magnetic core each capable of assuming either of two stable states of magnetic remanence; means coupled to said input core for placing said input core in one or the other of its two stable states; a sensing winding coupled to said input core; an input winding coupled to said output core; circuit means connecting said sensing winding and said input winding in series circuit; and means for connecting a voltage pulse source across said series circuit for driving the same current through each said sensing and input windings, said current being in a direction to switch, or to tend to switch, said input core to said one of its two states, said output core requiring a substantially larger current to effect switching thereof than does said input core, whereby when said input core is already in said one state at the time of application of said voltage pulse said sensing winding exhibits low impedance and sufficient current flows through said series circuit to switch said output core, but whereby when said input core is in its other state said sensing winding exhibits high impedance and insufficient current flows through said series circuit to switch said output core.

2. A logical "AND" circuit comprising, in combination: first and second input magnetic cores and an output magnetic core each capable of assuming either of two stable states of magnetic remanence; means coupled to said first and second input cores for placing each of said input cores in one or the other of its stable states; a sensing winding coupled to each of said input cores; and input winding coupled to said output core; circuit means connecting both said sensing windings and said input winding in series circuit; means for connecting a voltage pulse source across said series circuit for driving the same current through each said sensing and input windings, said current being in a direction to switch or to tend to switch said input cores to said one state, said output core requiring a substantially larger current to effect switching than do said input cores, whereby when said first and second input cores are each already in said one state said sensing windings exhibit low impedance and sufficient current flows through said series circuit to switch said output core, but whereby when either said first or second input core is in its other state said other-state core exhibits high impedance and insufficient current flows through said series circuit to effect switching of said output core; and means for detecting whether said output core switches in response to said voltage pulse.

3. A magnetic switching circuit comprising a first, a second, and a third magnetic element each having two magnetic states, said elements changing from one of said states to the other in response to predetermined magnetizing forces; windings linked to each of said elements; circuit means connecting said windings in the same series circuit, said predetermined magnetizing forces and the number of turns in said first, second and third element windings being such that the energizing current in each of said first and second element windings necessary to produce said predetermined magnetizing force for each of said first and second elements is smaller than the energizing current in said third element winding necessary to produce said predetermined magnetizing force for said third element; means for selectively applying magnetizing forces of one or the other polarity to said first and second elements to drive each to one or the other of said states; and means connectable to a voltage pulse source for driving a pulse of current through said series circuit in a direction to produce a change of state of said third element only if neither said first or second element changes its state in response to said current pulse.

4. A logical element comprising a saturable bistable magnetic core, at least one winding linking the core, three switches, a load impedance, and one or more sources of unidirectional voltage, a first of the switches being connected with one of the windings and sources into a first series circuit capable, when closed, of saturating the core in one sense regardless of its previous condition of magnetization, a second of the switches being connected with one of the windings and sources into a second series circuit capable, when closed, of saturating the core in the opposite sense regardless of its previous condition of magnetization, the third of said switches being connected with the load impedance and with one of the windings and sources into a third series circuit capable, when closed, of switching the flux in said core but incapable of reversing the condition of saturation of the core, and output circuit means for sensing the voltage across said load when said third series circuit is closed.

5. A logical element comprising a saturable bistable magnetic core, three windings linking the core, a load impedance and one or more unidirectional voltage pulse sources, a first of the pulse sources and windings being connected into a first series circuit capable, when closed, of saturating the core in one sense regardless of its previous condition of magnetization, a second of the pulse sources and windings being connected into a second series circuit capable, when closed, of saturating the core in the opposite sense regardless of its previous condition of magnetization, the third of said pulse sources and windings being connected with the load impedance into a third series circuit capable, when closed, of switching the flux in said core but incapable of reversing the saturation of the core, and output circuit means for sensing the voltage across said load when said third series circuit is closed.

6. A logical element comprising a saturable bistable magnetic core, three windings linking the core, an impedance, and a plurality of pulse sources of direct current potential difference, two of said pulse sources being connected with two of said windings into two separate series circuits each including a winding and pulse source, said two circuits tending to magnetize said core in opposite senses, the third of said windings being connected with a third of said pulse sources and with said impedance into a third series circuit, said first and second circuits being so proportioned that each when energized is capable of saturating the core regardless of its previous condition of magnetization, the third of said circuits being capable of switching the flux in said core but incapable of reversing the saturation of the core, and output circuit means for sensing the voltage across said impedance when said third series circuit is closed.

7. In combination, a body of ferromagnetic material characterized by a substantially rectangular hysteresis loop and three generators of magnetic field each including a pulse source of direct current potential difference and a conductor connected to said pulse source and coupled to said ferromagnetic body, the first of said generators including a load in series with its said conductor, the second and third of said generators being adapted when energized to generate substantially oppositely directed saturating fields in said body regardless of the previous condition of magnetization of said body, the first of said generators being capable of switching the flux in said core but incapable of reversing the condition of saturation of said body, and output circuit means for sensing the voltage across said load when said (third series circuit is closed) first generator is energized.

8. A circuit for the evaluation of a logical AND function involvlng two variable of possible zero and unit values, said circuit comprising two saturable magnetic cores, each exhibiting a substantially rectangular hysteresis loop, two sensing field generators having a switch in common and having separate series-connected windings one on each of said cores, two set field generators including each one winding on one of said cores, and two reset field generators having a switch in common and having series-connected windings one on each of said cores, a load impedance in series circuit with the two windings of said sensing field generators, and means for detecting the voltage produced across said load impedance in response to current flow through said series circuit.

9. A logic element comprising
- an input magnetic core capable of assuming either of two stable states of magnetic remanence,
- means coupled to said input core for placing the core in one of the other of its two stable states,
- a sensing winding coupled to said core,
- a load impedance connected in series circuit with said sensing winding,
- a source of substantially constant voltage connected in series with said sensing winding and load impedance, and
- means for detecting the current flow through said load impedance in response to voltage pulses from said voltage source.

10. A logic element as in claim 9 wherein the means for placing the input core in one or the other of its two stable states constitutes an input winding on such core, and wherein said input core also includes a reset winding.

11. A logic element as in claim 9 wherein the sensing winding exhibits a high impedance when said input core is in one of its stable states and a low impedance when said core is in the second of its stable states, and wherein the current flow through said series circuit is dependent upon the impedance condition of said sensing winding.

12. A logic element as in claim 11 wherein said load impedance exhibits a threshold characteristic beyond the level of the current which flows when said sensing winding exhibits a high impedance.

13. A logic element as in claim 9 wherein said load impedance comprises a second magnetic core and a winding on such core, the winding being connected in series circuit with the sensing winding on the input core.

14. A logic element as in claim 13 wherein the second core is capable of assuming either of two stable states of magnetic remanence.

15. A logic element as in claim 14 wherein the current flow from said voltage source is characterized by two discrete levels, a first level being responsive to and indicative of one stable state of said input core and the second level being responsive to and indicative of the second of its stable states, said first level being sufficient in magnitude to switch the state of said second core but said second state being insufficient in magnitude to do so.

16. A logic element as in claim 15 further including an advance winding on said second core and an output circuit coupled to said core.

17. A logic element as in claim 14 wherein said input core exhibits a longer switching time to current flow from said voltage source than does said second core.

18. A logic element as in claim 14 wherein the number of turns of the winding on the second core is less than the number of turns of the sensing winding on the input core.

19. A logic element as in claim 14 wherein the second core requires a substantially larger current to effect switching thereof than does the input core.

20. A logic element comprising
- an input magnetic core capable of assuming either of two stable states of magnetic remanence,
- means coupled to said input core for placing the core in one or the other of its two stable states,
- a sensing winding coupled to said core,
- circuit means attached to said sensing winding for applying a voltage signal to said sensing winding to sense the remanence condition of said core,
- the impedance of said sensing winding to current flow from said applied voltage signal being high when said core is in one of its remanent states, and low when the core is in the other of its remanent states,
- a load impedance in series with said sensing winding and said circuit means, said load impedance forming a series circuit with said sensing winding for current flow from the applied voltage signal,
- said load impedance being responsive to voltage signals received from said circuit means for providing an output voltage indicative of the state of said core.

21. A logic element as in claim 20, wherein said load impedance includes a second bistable magnetic core and a winding on such core, such winding being connected in series circuit with the sensing winding on said input core.

22. A logic element as in claim 21, further including an advance winding on said second core and an output circuit coupled to said core.

23. A logic element comprising
- a plurality of input magnetic cores each capable of assuming either of two stable states of magnetic remanence,
- means coupled to each of said input core for placing each such core in one or the other of its two stable states,
- a plurality of sensing windings, one on each of said cores, said sensing windings being connected in series,
- a load impedance connected in said series circuit with said sensing windings,
- a source of substantially constant voltage connected in series with said sensing windings and load impedance, and
- means for detecting the current flow through said load impedance in response to voltage pulses from said voltage source.

24. A logic circuit element comprising
- a plurality of input magnetic cores each capable of assuming either of two stable states of magnetic remanence, means coupled to each of said input cores for placing each such core in one or the other of its two stable states, a plurality of sensing windings, one on each of said cores, said sensing windings being connected in series, a load impedance connected in said series circuit with said sensing windings, circuit means connected to said series circuit for applying a voltage signal to said sensing windings, the impedance of each of said sensing windings to current flow from said voltage signal being high when its associated core is in one of its stable states and low when such core is in the other of its stable states, means for detecting the current flow through said load impedance in response to said voltage signals for producing an output signal responsive to the respective stable states of said input core.

25. A logic element as in claim 24 further including a unidirectional current conducting device shunting each of said sensing windings.

26. A logic element as in claim 24 further including a unidirectional current conducting device in series with said sensing windings and load impedance, said device being poled to block current flow in a direction opposite to the current produced by said voltage signal.

27. A logic element as in claim 24 wherein the logic circuit includes three input cores.

28. A logic element as in claim 24 wherein said load impedance includes a bistable output core and a winding on such core, such winding being connected in series circuit with the sensing windings on said input cores.

29. A logic element as in claim 24 including separate input windings on each of said input cores for independently setting each of the input cores either in one of the other of its stable states, and means for resetting all said input cores to one of their stable states.

30. A logic AND element comprising a plurality of input magnetic cores each capable of assuming either of two stable states of magnetic remanence, means coupled to each of said input cores for placing each such core in one or the other of its stable states, a plurality of sensing windings, one on each of said cores, said sensing windings being connected in a series circuit, circuit means connected to said series circuit for applying a voltage signal to said windings, each of said sensing windings exhibiting a high impedance to said voltage signal when its associated core is in one of its storage states and a low impedance when the core is in the other of its stable states, means for producing a predetermined output signal only when all of said input cores are in the stable state which produces a low impedance in their respective sensing windings, said means including a load impedance connected in series with said sensing windings.

References Cited

UNITED STATES PATENTS

| | | | |
|---|---|---|---|
| 2,729,807 | 1/1956 | Paivinen. | |
| 2,763,851 | 9/1956 | Haynes. | |
| 2,719,773 | 10/1955 | Karnaugh. | |
| 2,831,150 | 4/1958 | Wright et al. | 340—174 X |

STANLEY M. URYNOWICZ, Jr., Primary Examiner

U.S. Cl. X.R.

340—174